United States Patent
Sarkar et al.

(10) Patent No.: US 8,238,931 B1
(45) Date of Patent: Aug. 7, 2012

(54) AUXILIARY PILOT TRIGGERING BASED ON LATENCY

(75) Inventors: Debasish Sarkar, Irvine, CA (US); Sachin R. Vargantwar, Overland Park, KS (US); Siddharth S. Oroskar, Overland Park, KS (US); Deveshkumar Rai, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 292 days.

(21) Appl. No.: 12/634,818

(22) Filed: Dec. 10, 2009

(51) Int. Cl.
*H04W 72/00* (2009.01)
*H04B 1/00* (2006.01)

(52) U.S. Cl. ............ 455/453; 455/63.1; 455/522

(58) Field of Classification Search .......... 455/522, 455/63.1, 67.11, 452.1, 453, 452.2; 370/318, 370/342, 491, 500
See application file for complete search history.

(56) References Cited

U.S. PATENT DOCUMENTS

| | | | |
|---|---|---|---|
| 7,280,510 B2 | 10/2007 | Lohtia et al. | |
| 7,826,370 B1* | 11/2010 | Vargantwar et al. | 370/235 |
| 7,860,042 B2* | 12/2010 | Kim et al. | 370/318 |
| 7,889,706 B2* | 2/2011 | Ong et al. | 370/342 |
| 2004/0160914 A1 | 8/2004 | Sarkar | |
| 2004/0160984 A1 | 8/2004 | Sidhushayana et al. | |
| 2004/0218559 A1 | 11/2004 | Kim et al. | |
| 2004/0246924 A1 | 12/2004 | Lundby et al. | |
| 2006/0067292 A1 | 3/2006 | Ong et al. | |
| 2007/0165704 A1* | 7/2007 | Yang et al. | 375/148 |
| 2007/0253450 A1 | 11/2007 | Kuroda et al. | |

OTHER PUBLICATIONS

Unpublished U.S. Appl. No. 12/243,070 entitled "Variable Auxiliary Pilot Trigger and Performance" filed Oct. 1, 2008 in the name of Debasish Sarkar et al.
Unpublished U.S. Appl. No. 12/432,311 entitled "Dynamic Payload-Size Threshold for Triggering an Auxiliary Pilot" filed Apr. 29, 2009 in the name of Sachin Vargantwar et al.
Unpublished U.S. Appl. No. 12/569,120 entitled "Enhanced Reverse-Link Auxiliary Pilot Trigger" filed Sep. 29, 2009 in the name of Hamanth Pawar et al.
Unpublished U.S. Appl. No. 12/478,827 entitled "Reverse Noise Rise Based Payload Threshold Determination for Auxiliary Pilot Trigger" filed Jun. 5, 2009 in the name of Siddharth Oroskar et al.
Office Action in U.S. Appl. No. 12/478,827 mailed Feb. 22, 2011.
Office Action in U.S. Appl. No. 12/569,120 mailed Nov. 22, 2011.

* cited by examiner

*Primary Examiner* — Sonny Trinh

(57) ABSTRACT

A method and system is disclosed for dynamic adjustment of auxiliary pilot triggering based on latency. In an example embodiment, an AT that engages in a data communication that requires low latency will transmit its auxiliary pilot unconditionally and without regard to the payload sizes of the packets it transmits. Thus, the AT will not use a comparison of payload packet size with a threshold packet size when determining whether to transmit its auxiliary pilot. Rather, the AT will begin transmitting its auxiliary pilot upon a determination that it is engaged or will engage or has begun to engage in a communication that requires low latency. At the same time, an AT that engages in data communication that does not require low latency will advantageously trigger its auxiliary pilot less aggressively in response to an instruction from the base station to do so.

23 Claims, 7 Drawing Sheets

AUXILIARY PILOT TRIGGERING BASED ON LATENCY

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennae. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0, A, or other version thereof (hereafter "IS-856"). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Data on either link are encoded by the sender and decoded by the receiver. To facilitate decoding, the sender also transmits a beacon or "pilot" signal that, among other functions, provides the receiver with a timing reference for other signals transmitted by the sender. Under certain conditions, an AT can transmit on its reverse link a secondary beacon, or "auxiliary" pilot, that boosts the power of its "primary" pilot, and thereby enhances the precision and reliability of the base station's timing reference for the AT.

The access terminal switches its auxiliary pilot on and off in response to the size of the data payloads that the AT transmits in link-layer packets to its serving base station. More specifically, the size of a data payload corresponds to a volume of data transmitted per unit time, such that the larger the payload size, the higher the density of information per payload, and vice versa. As the payload size (and the density of information) increases, the precision and reliability of the base station's timing reference becomes more important to the base station's ability to correctly decode received data packets. In order to ensure a precise and reliable timing reference, the AT uses a threshold payload size to determine whether or not to trigger its auxiliary pilot, turning the auxiliary pilot on when the payloads of transmitted packets exceed the threshold size and turning it off when they are below threshold size.

In conventional operation, the threshold payload size is set in a system parameter that is disseminated to all AT operating in the wireless communication system. The value of the system parameter is determined, in part, according to various performance tradeoffs. A larger value will cause ATs to transmit larger payloads before triggering their auxiliary pilots. The result can be longer average battery life for the ATs, as well as less reverse link interference, but at the possible expense of higher decoding error rates of packets at the base stations. A smaller value will cause ATs to trigger their auxiliary pilots for smaller transmitted payload sizes. The result can be more reliable decoding of packets by the base stations, but at the possible expense of shorter average battery life for the ATs and more reverse link interference. Since the value of the threshold payload size parameter remains relatively fixed, possibly being adjusted only from time to time by the system operator, for example, the performance tradeoffs used in determining the value cannot take account of more immediate RF conditions that can vary dynamically in time and among ATs operating in the wireless communication system. Nor can they take account of other real-time or dynamic conditions associated with required or observed link quality.

Certain aspects of the limitations of conventional operation of an auxiliary pilot have been addressed in previously filed, co-pending patent applications. Specifically, dynamic adjustment of triggering of an auxiliary pilot in response to real-time RF conditions is described in U.S. patent application Ser. No. 12/432,311 entitled "Dynamic Payload-Size Threshold For Triggering An Auxiliary Pilot," filed Apr. 29, 2009 ("the Dynamic Threshold Application" herein) and in U.S. patent application Ser. No. 12/478,827 entitled "Reverse Noise Rise Based Payload Threshold Determination For Auxiliary Pilot Trigger," filed Jun. 5, 2009 ("the RNR Threshold Application" herein) both of which are incorporated herein by reference in their respective entireties for all purposes. The Dynamic Threshold Application describes how an access terminal may dynamically adjust the size of it payload-size threshold in response to receiving particular power-control commands from the RAN. The RNR Threshold Application describes how an access terminal may disable its auxiliary pilot in response to receiving an indication from the RAN of excessive reverse-link noise.

Aside from dynamically adjusting auxiliary pilot triggering in response to real-time RF conditions, it may be desirable to adjust auxiliary pilot triggering according to latency of packet communications. More particularly, it would be advantageous for an access terminal engaging in packet communications that require low latency to be able to transmit its auxiliary pilot even when the access terminal is transmitting packets with payload sizes smaller than the trigger threshold size. At the same time, it would be advantageous for access terminals engaging in "best-effort" packet communications (i.e., communication that do not require low latency) to use less aggressive triggering of their auxiliary pilots, and further to adjust their triggering in response to instructions issued by the RAN in accordance with an observed or measured latency of active communications. Accordingly, embodiments of the present invention advantageously provide dynamic adjustment of triggering of an auxiliary pilot in an access terminal based on latency of packet communications.

Hence in one respect, various embodiments of the present invention provide, in an access terminal operating in a wireless communication system that includes a base station, a method comprising: at the access terminal, making a determination of whether the access terminal will engage in a communication requiring low latency; responsive at least to the determination being that the access terminal will not engage in a communication requiring low latency, the access terminal beginning to operate in a best-effort state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal; and responsive at least to the determination being that the access terminal will engage in a communication requiring low latency, the access terminal beginning to operate in a low-latency state in which at least (i) the access terminal transmits the primary beacon signal on the air interface communication link to the base station, and (ii) the access terminal unconditionally activates and transmits the secondary beacon signal on the air interface communication link to the base station concurrently with transmission of the primary beacon signal.

In another respect, various embodiments of the present invention provide, in an access terminal operating in a wireless communication system that includes a base station, a method comprising: the access terminal operating in a state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal; at the access terminal, while both operating in the state and engaging in a communication that does not require low latency, receiving a packet-size-threshold message from the base station, the packet-size-threshold message being indicative of transmission delay monitored by the base station and including an updated threshold packet size; and responsive to receiving the packet-size-threshold message, the access terminal increasing the threshold packet size by an amount based on the updated threshold packet size.

In yet another respect, various embodiments of the present invention provide, in a base station configured to operate as part of a wireless communication system, a method comprising: at the base station, monitoring latency of packet communications with one or more access terminals served by the base station; at the base station, making a determination that the latency exceeds a threshold latency; and in response to the determination, broadcasting a packet-size-threshold message on an air interface to the one or more access terminals, the packet-size-threshold message including a threshold packet size for use by each of the one or more access terminals to set a respective trigger for controlling transmission power of a respective beacon signal to the base station.

In still a further respect, various embodiments of the present invention provide, an access terminal configured to operate in a wireless communication system that includes a base station, the access terminal comprising: means for making a determination of whether the access terminal will engage in a communication requiring low latency; means for, responsive at least to the determination being that the access terminal will not engage in a communication requiring low latency, beginning to operate in a best-effort state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal; and means for, responsive at least to the determination being that the access terminal will engage in a communication requiring low latency, beginning to operate in a low-latency state in which at least (i) the access terminal transmits the primary beacon signal on the air interface communication link to the base station, and (ii) the access terminal unconditionally activates and transmits the secondary beacon signal on the air interface communication link to the base station concurrently with transmission of the primary beacon signal.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-856 and IS-2000 communications in particular. As described below, IS-2000 applies to both circuit-cellular and packet-data communications, and is referred to herein as "conventional" CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
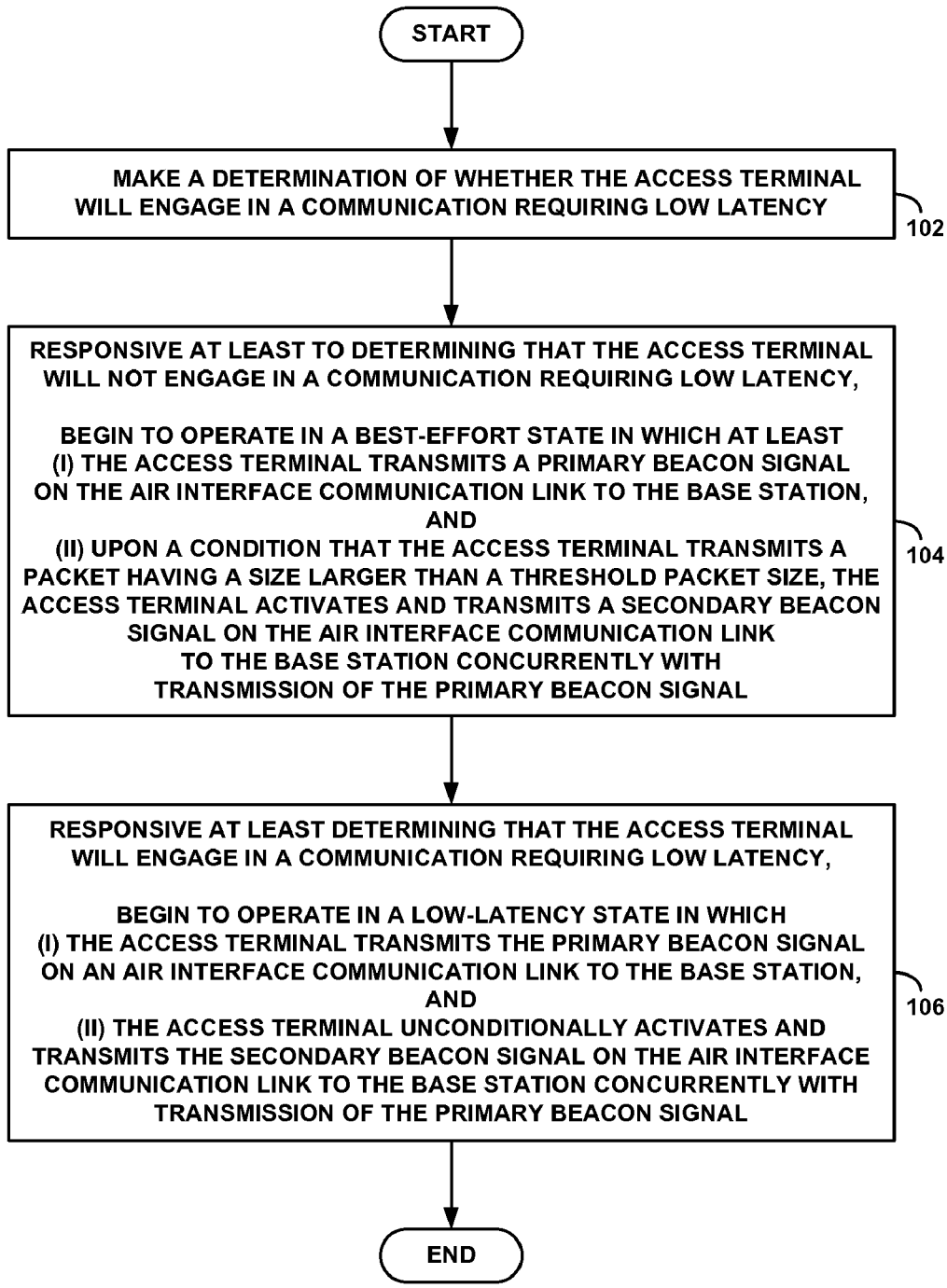
FIG. 1 is a flowchart illustrating an example embodiment of dynamic adjustment of auxiliary pilot triggering based on latency.

FIG. 1 is a flowchart illustrating an example embodiment of dynamic adjustment of auxiliary pilot triggering based on latency. By way of example, the steps of the flowchart could be implemented in an access terminal in a wireless communication system that includes a base station, and that operates according to a CDMA family of protocols. At step 102, the access terminal makes a determination of whether the access terminal will engage in a communication requiring low latency. In accordance with the example embodiment, making this determination could correspond to determining whether the access terminal will engage in a real-time communication, such as of voice over internet protocol (VoIP) call or session, a push-to-talk communication, or a real-time media transfer (e.g., streaming audio). As is known in the art, such a communication (or applications running over such a communication) is typically sensitive to packet transport delay. Consequently, latency—which is a form of delay—can be an issue affecting the quality of such communications. In particular, such communications require low latency to help ensure appropriate or acceptable quality of the communication or of a real-time application based on such a communication. Hence, at step 102, the access terminal determines whether it needs or will need low-latency communication. It will be appreciated that there could be other types of communications requiring low latency, and the present invention or embodiments thereof are not limited to just those specifically identified herein.

At step 104, in response to determining that it will not engage (or is not engaged) in a communication requiring low latency, the access terminal begins to operate in a best-effort state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal. In accordance with the example embodiment, the best-effort state could be an "active state" in which the access terminal is engaged in an EVDO packet-data communication session via the base station. In such an active state, the AT's transmission of its secondary beacon signal is conditioned on the size of the data packets that the AT transmits, whereby transmission of the secondary beacon signal (in accordance with packet size) helps maintain robustness of the communications.

For an AT and base station operating according to IS-856, for instance, the primary beacon signal could be the primary pilot transmitted by the AT on its reverse link to the base station. The pilot signal of an AT is used by the AT's serving base station, among other purposes, to establish and maintain a timing reference for the AT, which then facilitates decoding by the base station of other signals sent to by the AT on its reverse link. In accordance with the present example embodiment, the secondary beacon signal could then be an auxiliary pilot. The auxiliary pilot is identical to the primary pilot, except that it is transmitted at a lower power level. Transmission of the auxiliary pilot therefore effectively boosts the power of the primary pilot as received by the base station. In so doing, the precision and reliability of base station's timing reference for the AT is enhanced, thereby enhancing the reliability of decoding of the AT's reverse-link signals and, in turn, helping to keep latency low. In practice, the power level of each of the primary and auxiliary pilot is specified as a gain level, x, according to the relation $x \text{ dBm} = 10 \log_{10}(P/1 \text{ mW})$, where P is the power in mW (milliwatts). However, other power units could be used.

In further accordance with the example embodiment, making the determination that the AT will not engage (or is not engaged) in a communication requiring low latency could correspond to determining that the AT will engage (or is engaging) in a "best-effort" EVDO communication. For example, in a wireless communication system, data packets comprising different communication sessions (or different types of applications running on top of a given communication session) may be scheduled for transmission on a priority basis over a shared resource (e.g., time slots on an air interface traffic channel). In such a system, the term "best effort" is used by convention to characterize a priority level that permits transmission scheduling on a basis of availability of the shared resource, wherein availability is determined after other, higher priority packets have been scheduled for transmission. Hence, an AT operating in the best-effort state could be engaged in a best-effort communication session.

In still further accordance with the example embodiment, the condition that the access terminal transmits a packet having a size larger than a threshold packet size corresponds to a condition that the access terminal transmits a packet having a payload size larger than a threshold payload size. Under IS-856 (and other CDMA-related protocols), the payload size on the reverse link corresponds to an amount of data transmitted per unit time (e.g., bits per second). The higher the amount of data per unit time (i.e., the larger the payload size), the more important the need for a precise and reliable timing reference at the base station. Hence, activating, or "triggering," the auxiliary pilot for payload sizes exceeding the threshold size helps ensure that the base station will have a precise and reliable timing reference when it needs it. In a wireless communication system that operates according to a CDMA family of protocols including IS-856, the threshold packet size corresponds to a value of a system parameter dubbed "AuxiliaryPilotChannelMinPayload." Accordingly, the threshold condition of step 104 could be based on a comparison of payload size to AuxiliaryPilotChannelMin-Payload.

At step 106, in response to determining that it will engage (or is engaged) in a communication requiring low latency, the access terminal begins to operate in a low-latency state in which at least (i) the access terminal transmits the primary beacon signal on the air interface communication link to the base station, and (ii) the access terminal unconditionally activates and transmits the secondary beacon signal on the air interface communication link to the base station concurrently with transmission of the primary beacon signal. In accordance with the example embodiment, the low-latency state could also be an "active state," but one in which the access terminal is engaged in a real-time EVDO communication session or call via the base station. In such an active state, the AT's unconditional transmission of its secondary beacon signal maintains robustness of the communication session, thereby helping to ensure low-latency packet EVDO communications with the RAN.

The action in step 104 of the AT beginning to operate in the best-effort state could comprise the AT transitioning to operating the best-effort from operating in a previous state. For example, the AT could initially be in an "idle" state in which it has no active communication session, and thereafter enter the best-effort state in response to a user invoking a best-effort data application, such as email or a best-effort file transfer. In this case, the AT would determine before an EVDO communication session is established that the session does not require low latency. Hence, the EVDO communication session would be established as a best-effort communication, and the AT would correspondingly begin operating in the best-effort state by transitioning from the idle state. Alternatively, the AT could already be operating in the low-latency state when it determines that low-latency communication is no longer required. For instance, the AT may exit a VoIP call but maintain its EVDO session. In this case, the AT would begin operating in the best-effort state by transitioning from operating in the low-latency state.

Similarly, the action in step 106 of the AT beginning to operate in the low-latency state could also comprise the AT transitioning to operating the low-latency state from operating in a previous state. Again, the AT could initially be in an "idle" state, for example, and thereafter enter the low-latency state in response to a user invoking a low-latency data application, such as a VoIP call, push-to-talk, real-time media streaming, or the like. In this case, the AT would determine before an EVDO communication session is established that the session does require low latency. Hence, the EVDO communication session would be established as a low-latency communication, and the AT would correspondingly begin operating in the low-latency state by transitioning from the idle state. Alternatively, the AT could already be operating in the best-effort state when it determines that low-latency communication is now required. For instance, the AT may initiate a VoIP call or push-to-talk message while initially engaged in a best-effort EVDO session. In this case, the AT would begin operating in the low-latency state by transitioning from operating in the best-effort state.

Thus, in accordance with the example embodiment, beginning to operate in the low-latency state could comprise transitioning from operating in the best-effort state, and vice versa. Further, beginning to operate in either state could comprise transitioning from an idle state, or possibly states in which the AT operates.

In further accordance with the example embodiment, the AT unconditionally activating and transmitting the secondary beacon signal on the air interface communication link to the base station concurrently with transmission of the primary beacon signal at step 106 comprises the AT transmitting the secondary beacon signal concurrently with transmission of the primary beacon signal without regard to packet size of packets to be transmitted. In particular, a comparison of the payload size of packets the AT is transmitting (or will transmit) with a threshold size (i.e., AuxiliaryPilotChannelMinPayload in an EVDO session) will not be used to determine whether or not the AT should transmit is auxiliary pilot. Rather, the AT will transmit its auxiliary pilot based on the determination that the AT is engaged (or will engage) in a low-latency communication. In this sense, unconditional transmission of the auxiliary pilot may be considered a characteristic of the low-latency state.

In still further accordance with the example embodiment, the AT may receive a "packet-size-threshold" message from the base station, wherein the message contains an updated threshold packet size. By way of example, the updated packet size could be an updated value of AuxiliaryPilotChannelMinPayload, and the packet-size-threshold message could be an EVDO "Quick Config" message. If the AT is operating in the best-effort state when it receives the packet-size-threshold message, the AT will increase its current threshold packet size to the updated threshold packet size if its current size is smaller than the updated size in the message. If the AT's current threshold packet size is larger than the updated size, then the AT will leave its current threshold packet size unchanged.

In accordance with the example embodiment, reception of a packet-size-threshold message from the base station will be an indication that the base station has observed or measured excessive transmission delay of packets. Consequently, the AT will increase its threshold packet size and thereby restrict its use of its auxiliary pilot. That is, the increased threshold packet size will result in less aggressive triggering of the auxiliary pilot during AT's best-effort operation. The packet-size-threshold message will be broadcast to all ATs being served by the base station. Note, however, an AT that is in the low-latency state when it receives a packet-size-threshold message will continue to transmit its auxiliary pilot without regard to transmitted packet size. That is, reception of a packet-size-threshold message will have no effect on low-latency operation, at least in connection with triggering of the auxiliary pilot.

It should be understood that the designation of steps 104 and 106 in numerical order in the flowchart in FIG. 1 is made for the convenience of the discussion herein. That is, each of steps 104 and 106 describe actions taken by the access terminal based upon the determination made at step 102. As such, the numbering of steps 104 and 106 should not be taken as specifying or implying a relative, temporal ordering. It will also be appreciated that the steps of FIG. 1 are exemplary, and that additional and/or alternative steps or alternative ordering of steps could be carried out and still remain within the scope and spirit of the present invention.

Note that the characterization of the best-effort state of step 104 in terms of transmission of the primary beacon and the conditional transmission of the secondary beacon should not be viewed as limiting the first state to only the two described behaviors. The best-effort state could include other behaviors as well, provided those other behaviors don't contradict or are not mutually exclusive with the two explicitly-described behaviors of the first state. Further, since the transmission of the secondary beacon signal is conditioned on transmitted packet size, it is possible for an access terminal to operate in the first state and not transmit its secondary beacon signal if the condition is not met.

Similarly to the best-effort state of step 104, the characterization of the low-latency state of step 104 in terms of transmission of the primary beacon and the (now) unconditional transmission of the secondary beacon should not be viewed as limiting the low-latency state to only the two described behaviors. As with the best-effort state, the low-latency state could include other behaviors as well, provided those other behaviors don't contradict or are not mutually exclusive with the two explicitly-described behaviors of the low-latency state.

Figure 2:
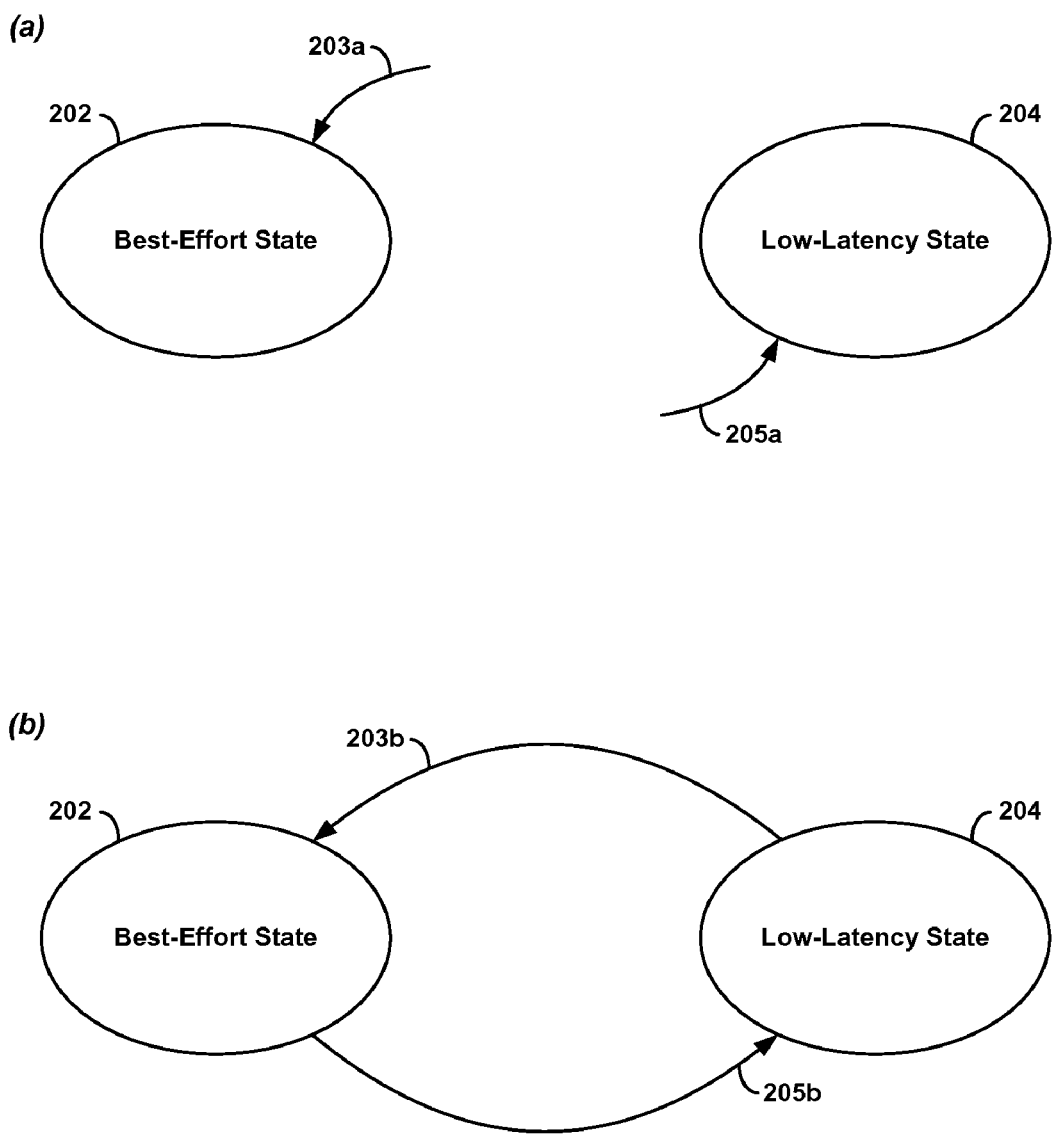
FIG. 2 is a state diagram illustrating an example embodiment of dynamic adjustment of auxiliary pilot triggering based on latency.

FIG. 2 provides a simple illustration of the best-effort and low-latency states and the transitions into and possibly between them. In panel (a) at the top, responsive at least to the determination that the access terminal will not engage in a communication requiring low latency, the access terminal begins 203a to operate in the best-effort state 202, wherein operation in the best-effort state could be characterized by the description above (e.g., step 104). Similarly, responsive at least to the determination that the access terminal will engage in a communication requiring low latency, the access terminal begins 205a to operate in the low-latency state 204, wherein operation in the low-latency state could be characterized by the description above (e.g., step 106). Panel (b) at the bottom illustrates transitions between the two states. Specifically, responsive at least to the determination that the access terminal will not engage in a communication requiring low latency, the access terminal transitions 203b from operating the low-latency state 204 to operating in the best-effort state 202. Similarly, responsive at least to the determination that the access terminal will engage in a communication requiring low latency, the access terminal transitions 205b from operating the best-effort state 202 to operating in the low-latency state 204. Thus panel (a) illustrates generally entering or beginning to operate in one or the other state, while panel (b) illustrates transitioning from one state to the other and vice versa. Note that entering or beginning to operate in one or another of the states could still correspond to a transition from operating in a preceding state.

Figure 3:
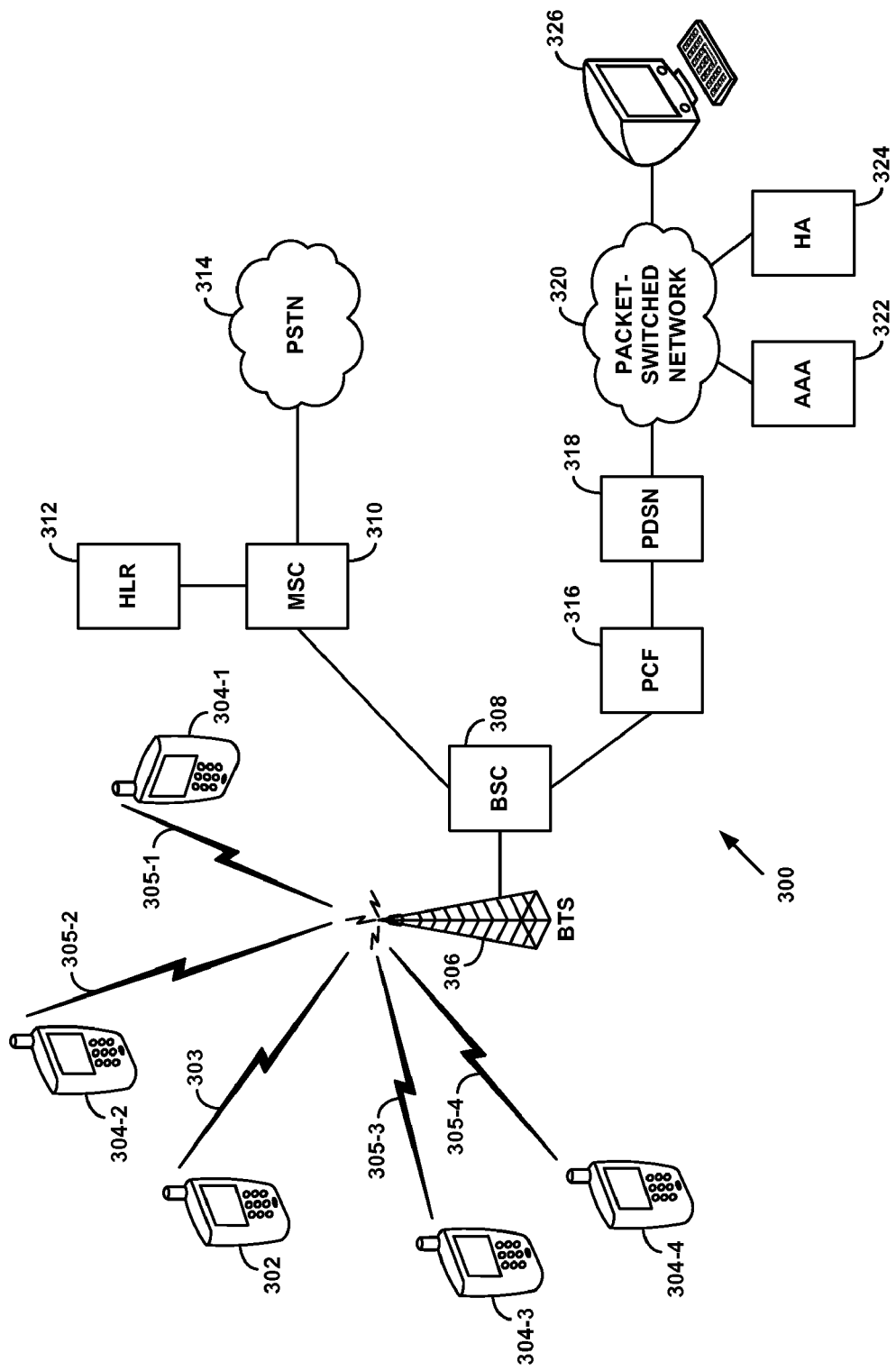
FIG. 3 is a simplified block diagram of a wireless communication system in which an example embodiment of dynamic adjustment of auxiliary pilot triggering based on latency can be employed.

FIG. 3 shows a simplified block diagram of a wireless communication system 300 in which an example embodiment of dynamic adjustment of auxiliary pilot triggering based on latency can be employed. Access terminal AT 302 communicates over an air interface 303 with a BTS 306, which is then coupled or integrated with a BSC 308. Transmissions over air interface 303 from BTS 306 to AT 302 represent the forward link to the access terminal (also referred to herein alternatively as the forward link from the base station, and as "the AT's forward link"). Transmissions over interface 303 from AT 302 to BTS 306 represent the "reverse link" (also referred to herein as "the AT's reverse link"). Four other access terminals, AT 304-1, 304-2, 304-3, and 304-4, are also depicted in FIG. 3. As indicated, they communicate with BTS 306 over air interfaces 305-1, 305-2, 305-3, and 305-4, respectively. Each of these air interfaces is operationally similar to air interface 303, each representing at least a forward and reverse link. It will be appreciated that this arrangement is for purposes of illustration.

BSC 308 is connected to MSC 310, which acts to control assignment of air traffic channels (e.g., over air interfaces 303, 305-1, 305-2, 305-3, and 305-4), and provides access to wireless circuit-switched services such as circuit-voice and circuit-data (e.g., modem-based packet data) service. As represented by its connection to PSTN 314, MSC 310 is also coupled with one or more other MSCs or other telephony circuit switches in the operator's (or in a different operator's) network, thereby supporting user mobility across MSC regions, and local and long-distance landline telephone services. Also connected to MSC 310 is home location register (HLR) 312, which supports mobility-related aspects of subscriber services, including dynamic tracking of subscriber registration location and verification of service privileges.

As shown, BSC 308 is also connected with a PDSN 318 by way of packet control function (PCF) 316. PDSN 318 in turn provides connectivity with a packet-switched network 320, such as the Internet and/or a wireless carrier's private core packet-network. Sitting as nodes on network 320 are, by way of example, an authentication, authorization, and accounting (AAA) server 322, a mobile-IP home agent (HA) 324, and a remote computer 326. After acquiring an air traffic channel over its air interface, an access terminal (e.g., AT 302) may send a request to PDSN 318 for a connection in the packet data network. Then, following authentication of the access terminal by AAA server 320, the access terminal may be assigned an IP address by the PDSN or by HA 324, and may thereafter engage in packet-data communications with entities such as remote computer 326.

It should be understood that the depiction of just one of each network element in FIG. 3 is illustrative, and there could be more than one of any of them, as well as other types of elements not shown. The particular arrangement shown in FIG. 3 should not be viewed as limiting with respect to the present invention. Further, the network components that make up a wireless communication system such as system 300 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminals 302, 304-1, 304-2, 304-3, and 304-4 typically comprises a user-interface, I/O components, a communication interface, a tone detector, a processing unit, and data storage, all of which may be coupled together by a system bus or other mechanism. As such, system 300, ATs 302, 304-1, 304-2, 304-3, and 304-4, and air interfaces 303, 305-1, 305-2, 305-3, and 305-4 collectively are representative of example means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each sector is distinguished from adjacent sectors by a pseudo-random number offset ("PN offset"). Further, each sector can concurrently communicate on multiple different channels, distinguished by "Walsh codes." In doing so, each channel is allocated a fraction of the total power available in the sector. When an access terminal operates in a given sector, communications between the access terminal and the BTS of the sector are carried on a given frequency and are encoded by the sector's PN offset and a given Walsh code. The power allocated to each channel is determined so as to optimize the signal to noise characteristics of all the channels, and may vary with time according to the number of access terminals being serviced, and their relative positions with respect to the BTS, among other factors.

Air interface communications are divided into forward link communications, which are those passing from the base station to the access terminal, and reverse link communications, which are those passing from the access terminal to the base station. In an IS-2000 system, both the forward link and reverse link communications in a given sector are encoded by the sector's PN offset and a given Walsh code. On the forward link, certain Walsh codes are reserved for use to define control channels, including a pilot channel, a sync channel, and one or more paging channels (depending on service demand, for example), and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary as the AT moves about within the wireless communication system, or as other factors cause the AT's RF conditions to change. The AT reports the received signal strengths to the serving base station, which then directs the AT to update its active set in accordance with the reported strengths and one or more threshold conditions.

With arrangement described above, an access terminal can engage in cellular voice or packet-data communications. Referring again to FIG. 3, and taking an originating call from AT 302 as an example, AT 302 first sends an origination request over air interface 303 and via the BTS 304 and BSC 306 to MSC 308. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 316 by way of PCF 314. The PDSN 316 and access terminal 302 then negotiate to establish a data link layer connection, such as a point to point protocol (PPP) session. Further, the PDSN 316 sends a foreign agent advertisement that includes a challenge value to the access terminal, and the access terminal responds with a mobile-IP registration request (MIP RRQ), including a response to the challenge, which the PDSN forwards to HA 322. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, the BTS of a serving sector transmits to all its active ATs on a common forward link, using time division multiplexing (TDM) to distinguish transmissions among the recipient ATs. Each transmission is made at the full power of the sector, thereby optimizing the achievable signal-to-noise characteristics. As a result of the full-power allocation by the sector, an access terminal operating under IS-856 can, in theory, receive packet-data at a rate of at least 38.4 kbps and up to 2.4 Mbps on its forward link. The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. As in IS-2000, each sector in IS-856 is defined by a PN offset, and the pilot channel carries an indication of the sector's PN offset.

As noted, the IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include a pilot that serves as beacon signal for identifying the AT to the RAN and for establishing and maintaining a timing reference for decoding other signals received at the RAN from the AT.

Under IS-856, an access terminal communicates with the network via just one "serving" sector any given time. Typically the AT's serving sector is the "best" sector of its active set at the given time, and the process of handing off from one serving sector to another from the active is referred to as "virtual soft handoff." As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

In operation, each AT with an active data session in a given sector encodes reverse-link traffic-channel data using the same PN long code but with an AT-specific long-code mask. Each AT also transmits its pilot signal, which consists of all zeros encoded with a PN short code of zero and further encoded using an AT-specific long-code mask. ATs having active sessions with a given serving base station (or in a given sector) can transmit concurrently, so the serving base station receives a signal that is generally the superposition of transmissions from multiple ATs. The serving base station knows the long-code mask of each served AT with an active data session, and uses the mask to sort out each AT's pilot signal in order establish and maintain that AT's timing reference. A base station's timing reference for a given AT is essentially a synchronization with the AT's chips. Once the base station establishes synchronization, it can apply the AT's long-code mask to sort out data received from that AT and decode the data on a chip-by-chip basis. The pilot is transmitted nearly continuously during every 2,048-chip timeslot, allowing the base station to continuously update its timing reference for the AT as the AT moves about in the sector, or as other factors cause the AT's operational RF conditions to change.

Operation in an IS-856 compliant communication system may be illustrated, again with reference to FIG. 3. To acquire packet data connectivity under IS-856, after an access terminal first detects an IS-856 carrier, the access terminal sends to its BSC (or RNC) 306 a UATI (Universal Access Terminal Identifier) request, and receives in response an UATI, which the access terminal can then use to identify itself in subsequent communications with the BSC. The access terminal then sends a connection-request to the BSC 306, and the BSC responsively invokes a process to authenticate the access terminal and to have the access terminal acquire a data link.

In particular, the BSC 306 sends an access request to an Access Network AAA (ANAAA) server (which may be different than the AAA server 320), and the ANAAA server authenticates the access terminal. The BSC 306 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 316 (via PCF 314), and the PDSN and access terminal then negotiate to establish a PPP data link. In addition, as in the IS-2000 process, the access terminal then sends an MIP RRQ to the PDSN, which the PDSN forwards to the HA 322, and the HA assigns a mobile-IP address for the access terminal to use.

Once the access terminal has acquired an IS-856 radio link, a data link, and an IP address, the access terminal is considered to be in an active mode (or state). In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. Auxiliary Pilot Trigger a. Operating Principles

As described above, under IS-856 the reverse link consists of an access channel and a traffic channel. The traffic channel is further subdivided into a pilot channel, a MAC channel, and ACK channel and a data channel. The MAC channel further includes a reverse rate indicator (RRI) channel and a DRC channel. The transmission power applied to each of these channels is tied (or linked) to that of the pilot channel. An access terminal adjusts the power of its pilot signal (i.e., the gain applied to its pilot channel) in response to power-control commands received from the base station. At the same time, the power applied to each of the other channels is scaled in relation to the pilot signal, such that the relative gain of each channel with respect to that of the pilot channel is kept fixed. For example, in typical operation, the reverse ACK channel is transmitted at 3 dB higher than the pilot channel (twice the pilot signal power), the RRI channel is transmitted at the same gain as the pilot channel (same power as the pilot signal), and the data channel is transmitted 3 dB lower (½ the pilot signal power). Note that using a fixed gain factor with respect to the gain of the pilot channel is equivalent to using a fixed power ratio with respect to the power of the pilot channel.

The data rate achievable on the reverse link depends on a combination of factors, including noise characteristics of the reverse link as reported to the AT by the base station, the amount of data to be sent by the AT, and the amount of reverse-link power the AT has to spare ("head room"). In turn, the data rate will be used to determine the size of the payload of link-layer packets sent from the AT to the base station. A higher achievable data rate supports higher-density coding, and hence more data symbols per frame and a correspondingly larger payload size. Conversely, a smaller data rate accommodates lower-density coding and thus a smaller payload size.

The ability of the base station to correctly decode a packet received from a given AT depends on (among other factors) the quality and reliability of the base station's timing reference for the AT, which, in turn, depends (at least in part) on the strength of the AT's pilot signal. In particular, as payload size grows with the data rate of an AT's reverse-link data channel, the importance of a reliable timing reference for that AT at the serving base station correspondingly increases. To help ensure the requisite reliability, Rev. A of the IS-856 standard introduced an "auxiliary pilot" signal that an AT turns on and off according to the payload size that the AT transmits on its reverse-link data channel. Specifically, in conventional operation under IS-856, Rev. A, a system-wide threshold of payload size is set according to a single, system-wide parameter called "AuxiliaryPilotChannelMinPayload" such that an access terminal will turn on its auxiliary pilot whenever the AT starts transmitting link-layer packets with payloads at least as large as the threshold. The AT will subsequently turn off its auxiliary pilot if the payload size drops below the threshold. With the introduction of the auxiliary pilot, the nominal pilot is redesignated as the "primary pilot" signal (or channel).

When switched on, an AT's auxiliary pilot is conventionally transmitted at a fixed gain below that of the primary pilot, typically at −9 dB with respect to the gain of the primary pilot (although other values could be used). Except for the reduced power level with respect to the primary, however, the auxiliary pilot is identical the primary, being encoded with the same PN long-code mask. Thus, the primary and auxiliary pilots are effectively additive to a single pilot signal that is identical to either one of them but having their combined transmission power. From the perspective of the serving base station, the AT appears to be transmitting a stronger pilot signal when its auxiliary pilot is switched on. In turn, the base station's timing reference for the AT is made more precise and reliable.

b. Dynamic Adjustment of Auxiliary Pilot Triggering Based on Latency

While use of a threshold packet size to determine whether or not an AT should switch its auxiliary pilot on or off can help ensure reliable decoding of data by the base station, triggering the auxiliary pilot based on packet size alone cannot account for either delay requirements of particular communications or a variety of dynamic conditions that may affect delay of reverse-link communications. More particularly, real-time communications or communication applications, such as VoIP, push-to-talk, and real-time media streaming, to name a few, typically require limits on packet transmission delay in order to deliver requisite or acceptable service quality. At the same time, applications such as email and certain file transfers, among others, generally have less stringent requirements on packet transmission delay. Conventional operation of an auxiliary pilot does not distinguish between these different types of applications and their respective delay requirements.

An important metric of delay is latency, which is a measure of the time it takes for a packet to get from a source to a destination. Among the factors that contribute to latency in an EVDO communication (or other communications carried out according to a CDMA family of protocols) is the reliability with which a receiving entity can decode data received from a sending entity on the air interface. Specifically, unreliable decoding can result in lost data and retransmissions, which in turn lead to increased latency (delay). For a base station receiving EVDO reverse-link transmissions from a given AT, the enhanced reliability provided by the AT's auxiliary pilot can therefore play an important role in reducing and/or controlling latency in communications with the given AT. If the AT is engaged in one or another real-time communication that requires low latency, controlling auxiliary pilot use according to conventional threshold payload size triggering can deprive the real-time communication of a means of helping to reduce and/or maintain low latency.

Another factor that can contribute to overall latency in a wireless system is the impact of reverse-link interference on the respective reverse-link communications of one or more access terminals. As reverse-link noise and interference increases, the general rates of failed packet reception at the base station and of retransmissions may also increase, leading to a corresponding increase in overall latency. In this regard, conventional use of an auxiliary pilot by ATs engaged in a packet communication can add to reverse-link noise and interference, and hence can tend to increase overall latency. If an AT is engaged in a packet communication that does not require low latency and/or that can tolerate transmission delay (i.e., a best-effort communication), then the AT may be able to receive an acceptable level of service even without using its auxiliary pilot, or at least using less aggressive triggering of its auxiliary pilot. As a corollary, a "best-effort AT" can, under some circumstances, unnecessarily contribute to reverse-link interference (and hence overall system latency) when it uses its auxiliary pilot conventionally.

In order to both accommodate the requirement of low-latency communications for ATs engaged in delay-sensitive, real-time applications, and limit or mitigate the contribution of best-effort ATs to overall system latency, embodiments of the present invention provide a method and system of dynamic triggering of auxiliary pilots based on latency. In accordance with an example embodiment, an AT that engages in an EVDO communication that requires low latency will advantageously transmit its auxiliary pilot unconditionally and without regard to the payload sizes of the packets it transmits. Thus, the AT will not use a comparison of payload packet size with AuxiliaryPilotChannelMinPayload (or other threshold packet size) when determining whether to transmit its auxiliary pilot. Rather, the AT will begin transmitting its auxiliary pilot upon a determination that it is engaged or will engage or has begun to engage in an EVDO communication that requires low latency.

In further accordance with the example embodiment, an AT that engages in an EVDO communication that does not require low latency will advantageously trigger its auxiliary pilot less aggressively in response to an instruction from the base station to do so. Specifically, the base station will broadcast an updated value of AuxiliaryPilotChannelMinPayload (or other threshold packet size) to ATs being served by the base station, thereby causing those served ATs using smaller values of AuxiliaryPilotChannelMinPayload to revise their values upward, and hence cause the ATs to trigger their auxiliary pilots less aggressively.

Dynamic triggering of auxiliary pilots based on latency can thus be described in terms of AT operation in both a low-latency state and a best-effort state. Both are described in more detail below by way of example. Operation in the best-effort state includes AT response to a message from the base station (or other RAN element), so base station functions related to the best-effort state are also described below, again by way of example.

(1) Low-Latency State

In accordance with the example embodiment, the determination that the AT is engaged or will engage in a low-latency communication will cause the AT to begin to operate in a low-latency state that is characterized, at least in part, by the AT unconditionally transmitting its auxiliary pilot. Unconditional transmission of the AT's auxiliary pilot may therefore be viewed as a characteristic of the operational state that the AT enters in response to the determination. Moreover, beginning to operate in the low-latency state could correspond to the AT transitioning into the low-latency state from another operational state. In particular, the AT could transition from an idle state if the AT has no active EVDO communication session prior to making the determination. Alternatively, the AT could transition from a best-effort state (in which the AT triggers its auxiliary pilot according to payload size) if the AT is engaged in a best-effort EVDO communication session prior to making the determination. As described below, the best-effort state is characterized by an adjustable threshold packet size for auxiliary pilot triggering.

As an example of entering the low-latency state from an idle state, a user of an AT could invoke an application (e.g., a program stored in the AT's memory and executable on one or more processors of the AT) that establishes a VoIP call or session. The application could then initiate an EVDO communication session via a serving base station (or BTS cell or sector) according to well-known protocols. In so doing, the AT would acquire a forward-link traffic channel from the base station and establish a reverse-link traffic channel with the base station. At the same time, the AT would recognize the VoIP application as one requiring low latency, and would responsively enter the low-latency state concurrently with establishment of the EVDO communication (and the VoIP call or session established via the EVDO communication via the base station). Thus, the AT would begin unconditional transmission of its auxiliary pilot beginning with the VoIP call or session, having had no active EVDO communication session prior to the invocation of the VoIP application (and the determined need for low latency).

As an example of entering the low-latency state from a best-effort state, a user of an AT could be engaged in a best-effort application, such as email, via a previously-established, best-effort EVDO communication. For instance, the user may have previously invoked an internet browser that initially began executing (e.g., as an executable program on one or more processors of the AT) as a best-effort application, and which caused the AT to establish a best-effort EVDO communication (as described in more detail below). Again, the application (e.g., a browser program) could have initiated a best-effort EVDO communication session via a serving base station (or BTS cell or sector) according to well-known protocols. In so doing, the AT would have acquired a forward-link traffic channel from the base station and established a reverse-link traffic channel with the base station. After initially engaging in a best-effort browser application (e.g., email), the user may at some later time invoke a push-to-talk application (or other real-time application) that requires low-latency communication. The AT would recognize that the push-to-talk application as one requiring low latency, and would responsively transition from the best-effort state to the low-latency state. Thus, the AT would begin unconditional transmission of its auxiliary pilot beginning with the push-to-talk application after transitioning from the best-effort state.

It will be appreciated that the exact timing of when unconditional transmission of the auxiliary pilot begins could vary, and is not limiting with respect to the present invention or embodiments thereof. For instance, an AT entering the low-latency state without having a prior established EVDO communication session could begin unconditional transmission of the auxiliary pilot when the EVDO communication begins, but before the VoIP call (in the above illustration) is fully established. Alternatively, unconditional transmission could begin concurrently with completion of call setup, but after the EVDO communication is established. For an AT entering the low-latency state from a prior established best-effort state, unconditional transmission of the auxiliary pilot could begin when the push-to-talk session (in the above illustration) is first invoked, but before it becomes active. Alternatively, unconditional transmission could begin once the push-to-talk session becomes active. Further, it could be possible for the AT to transition to the low-latency state from a state other than the idle state or the best-effort state. It will also be appreciated that the VoIP and push-to-talk applications are illustrative of a real-time applications that would require low latency, and that other applications requiring low latency could similarly cause the AT to begin operating in the low-latency state.

(2) Best-Effort State

In accordance with the example embodiment, the determination that the AT is not engaged or is not about to engage in a low-latency communication will cause the AT to begin to operate in a best-effort state that is characterized, at least in part, by the AT activating (triggering) and transmitting its auxiliary pilot in response to determining that the AT is transmitting (or will transmit) packets with payload sizes exceeding a locally-stored value of AuxiliaryPilotChannelMinPayload. The best-effort state is further characterized by the AT adjusting the value of AuxiliaryPilotChannelMinPayload in response at least to receiving a packet-size-threshold message from its serving base station. More particularly, in further accordance with the example embodiment, a packet-size-threshold message includes an updated value of AuxiliaryPilotChannelMinPayload set by the base station. If the AT determines that its current (e.g., locally-stored) value of AuxiliaryPilotChannelMinPayload is smaller than the updated value, then the AT will replace its current value with the updated value in the received packet-size-threshold message.

Triggering of the AT's auxiliary pilot based on AuxiliaryPilotChannelMinPayload, wherein the value of AuxiliaryPilotChannelMinPayload is adjustable according to a message or instruction from the base station, may therefore be viewed as a characteristic of the operational state that the AT enters in response to the determination that the AT is not engaged or will not immediately engage in a low-latency communication. Moreover, beginning to operate in the best-effort state could correspond to the AT transitioning into the best-effort state from another operational state. In particular, the AT could transition from an idle state if the AT has no active EVDO communication session prior to making the determination. Alternatively, the AT could transition from the low-latency state (in which the AT unconditionally transmits its auxiliary pilot) if the AT is engaged in a low-latency EVDO communication session prior to making the determination that the AT is not engaged or will not immediately engage in a low-latency communication.

As an example of entering the best-effort state from an idle state, a user of an AT could invoke an email program (or other application that does not require low-latency). The email program could then initiate an EVDO communication session via a serving base station (or BTS cell or sector) according to well-known protocols. In so doing, the AT would acquire a forward-link traffic channel from the base station and establish a reverse-link traffic channel with the base station. At the same time, the AT would recognize the email program as one not requiring low latency (or one for which best-effort is acceptable), and would responsively enter the best-effort state concurrently with establishment of the EVDO communication (and the email program that uses the EVDO communication via the base station). Thus, the AT would begin triggering its auxiliary pilot according to its locally-stored value of AuxiliaryPilotChannelMinPayload, beginning with execution of the email program, having had no active EVDO communication session prior to the invocation of the email program (and the determination that only best-effort communication is needed).

As an example of entering the best-effort state from a low-latency state, a user of an AT could be engaged in a low-latency application, such as VoIP, via a previously-established, low-latency EVDO communication, as described by way of example above. Again, the AT would have acquired a forward-link traffic channel from the base station and established a reverse-link traffic channel with the base station. After initially engaging in a VoIP call (or other low-latency application), the user may disconnect the call or otherwise exit the low-latency application while still maintaining the EVDO communication. The AT would then recognize that low-latency communication is no longer required (assuming that no other low-latency applications are still executing on the AT), and would responsively transition from the low-latency state to the best-effort state. Thus, the AT would begin triggering its auxiliary pilot according to its locally-stored value of AuxiliaryPilotChannelMinPayload, after transitioning from the best-effort state.

It will be appreciated that the exact timing of when auxiliary pilot triggering according to AuxiliaryPilotChannelMinPayload begins could vary, and is not limiting with respect to the present invention or embodiments thereof. For instance, an AT entering the best-effort state without having a prior established EVDO communication session could begin triggering its auxiliary pilot according to its locally-stored value of AuxiliaryPilotChannelMinPayload when the EVDO communication begins, but before the email program (in the above illustration) engages in any data transfer. Alternatively, auxiliary pilot triggering according to AuxiliaryPilotChannelMinPayload could begin concurrently with an actual email data transfer, but after the EVDO communication is established. For an AT entering the best-effort state from a prior established low-latency state, auxiliary pilot triggering according to AuxiliaryPilotChannelMinPayload could begin when VoIP session (in the above illustration) ends. Further, it could be possible for the AT to transition to the best-effort state from a state other than the idle state or the low-latency state.

It will also be appreciated that the email program is illustrative of a best-effort application that does not require low latency, and that other best-effort applications could similarly cause the AT to begin operating in the best-effort state, as long as no low-latency applications are also executing. Further, entering the best-effort state from an idle state could be a default transition if an EVDO communication is established without a specific low-latency application or best-effort application being invoked. That is, if an EVDO communication session is established but no communication application that uses the session is invoked.

In further accordance with an example embodiment, an access terminal that is operating in the best-effort state will respond to reception of a packet-size-threshold message by increasing the threshold packet size based on an updated threshold packet size included in the received message. More specifically, the AT will compare the updated threshold packet size with a current value of threshold packet size that the AT is using for triggering its auxiliary pilot. The current value of the threshold is the value prior to the AT receiving the packet-size-threshold message. If the AT's current value is smaller than the updated value, then the AT will replace its current threshold packet size with the updated threshold packet size. In this way, the best-effort AT will adopt less aggressive triggering of its auxiliary pilot, and thereby reduce its contribution to reverse-link noise and interference. Advantageously, overall system latency may thereby be reduced, or at least subject to limitation. If the AT's current value is not smaller than the updated value, then the AT will retain its current threshold packet size.

For operation under IS-856, the threshold packet size is set according to the AuxiliaryPilotChannelMinPayload parameter. Thus, in accordance with the example embodiment, the current value of threshold packet size is a current value of AuxiliaryPilotChannelMinPayload stored in one or another form of memory on the AT. In further accordance with the example embodiment, the updated threshold packet size is an updated value of AuxiliaryPilotChannelMinPayload set by the base station and broadcast by the base station in a packet-size-threshold message. A packet-size-threshold message could be a new EVDO message, or could be an existing (known) EVDO control message with the added functionality of communicating an updated value of AuxiliaryPilotChannelMinPayload to access terminals with active EVDO sessions. By way of example, such an existing (known) EVDO control message could be a Quick Config message, although other existing EVDO messages could be used.

In addition to adjusting AuxiliaryPilotChannelMinPayload in response to receiving a packet-size-threshold message from the base station, an AT might also incorporate a capability of adjusting AuxiliaryPilotChannelMinPayload in response to messages other than a packet-size-threshold message or to indications of RF operating conditions, as described in the Dynamic Threshold Application referenced above. Consequently, different ATs operating in a common coverage area could come to have different values of AuxiliaryPilotChannelMinPayload at any one time. Hence, a multiplicity of ATs operating in respective best-effort states in accordance with the example embodiment described herein could derive different outcomes when comparing their respective current values of AuxiliaryPilotChannelMinPayload with an updated value received in a packet-size-threshold message broadcast by a common serving base station.

In still further accordance with the example embodiment, the current value of an AT's threshold packet size could be one of a table of values. For instance, the AT can maintain in its memory a table of values arranged in increasing order from a minimum value to a maximum value, wherein current value would correspond to one of the table entries. If a best-effort AT determines that it needs to increase its current value based on comparison with an updated value received in a packet-size-threshold message from the base station, it could select a value from the table that matches or exceeds the updated value.

As described above, conventional operation of auxiliary pilot triggering employs a single, system-wide value of AuxiliaryPilotChannelMinPayload that is used by all ATs, and that is not adjusted dynamically, but rather may be changed from time to time by a system operator. In practice, AuxiliaryPilotChannelMinPayload is typically specified to be one of the values in the list {128, 256, 512, 768, 1,024, 1,536, 3,072, 4,096, 6,144, 8,192, 12,288}, in units of bits. In accordance with the example embodiment of dynamic adjustment of the threshold packet size, the values in the table used by the AT could be the same as those in this list of values used for AuxiliaryPilotChannelMinPayload, although other table values could be specified as well. Thus, AuxiliaryPilotChannelMinPayload becomes a dynamic parameter in the example embodiment and other embodiments of the present invention.

As described below, the base station could maintain a copy of the same table of values in its memory, and select one the values for inclusion in a packet-size-threshold message. Alternatively, if ATs and the base station all maintain copies of the same table, the packet-size-threshold message could contain an index to a particular table entry instead of the actual value of the table entry. An AT receiving such a packet-size-threshold message could then make its value comparison based on the received index and the index of its current value.

(3) Base Station Adjustment of Threshold Packet Size

In accordance with the example embodiment, the base station will monitor packet latency in EVDO communications with ATs it is serving, and based on the monitored latency, the base station will set an updated value of AuxiliaryPilotChannelMinPayload, and include the updated value in a packet-size-threshold message and broadcast the message to the served ATs. More particularly, the AT will maintain a current value of AuxiliaryPilotChannelMinPayload, wherein the current value corresponds to that broadcast in the most recent packet-size-threshold message. The base station will also periodically compare an observed or measured value of latency with a threshold latency value. If the base station determines that the observed latency exceeds the threshold latency, then the base station will replace AuxiliaryPilotChannelMinPayload with an increased (updated) value and broadcast the increased value in a packet-size-threshold message. The increased value in the message thereby corresponds to the updated value, as interpreted by ATs that receive the message.

Latency can be measured by the base station (or other RAN element or elements) in a number of ways. In practice, the RAN tracks various performance metrics in order to monitor overall system operation, recognize problems that may arise, and diagnose errors, among other functions of system operation and management. The metrics include a number of measures of latency and/or of performance related to latency. For example, the RAN typically tracks call setup or session setup time, which corresponds to the delay from the instant when a new call or session is initiated (e.g., by an access terminal) to the instant when a traffic channel assignment for the session is made and the call or session becomes active. This information is collected on a session-by-session basis, and the aggregate information can be analyzed on various time scales (e.g., minutes, hours, etc.) and over various localizations (e.g., sectors, BTSs, base stations, geographic regions, etc.).

Calls or sessions could be categorized as voice calls or (EVDO) data sessions, wherein data sessions could be further classified as real-time or best effort. By way of example, a real-time data session could be a push-to-talk communication. As is known in art, a push-to-talk communication is a real-time communication that requires a very short set-up time so as to be perceived by users as "instant." Typically, a push-to-talk communication is invoked when a sending user presses a button on a sending AT, and set-up is complete when a receiving user receives a beep (or other alerting signal) on a receiving AT. The RAN can monitor the set-up times of all push-to-talk sessions in a sector or other coverage area, and thereby determine an overall latency according to aggregate statistics of the measured set-up times.

Another example of a latency measure is packet transfer delay, which corresponds to the time required for a packet to be transmitted from a source to a destination, wherein the source could be an AT and the destination could be another AT or a base station. Other source-destination pairs are possible as well. The delay could be measured as the time from when a packet is transmitted until an acknowledgement is received. As with set-up times, the RAN could monitor packet latency on various time scales and for various configurations of aggregation (e.g., per session, per sector, per coverage area, etc.). Other latency metrics are possible as well.

In accordance with the example embodiment, the base station (or other RAN element or elements) will periodically compare one or another latency measurement with a threshold latency (for the particular metric). By way of example, the base station could make the comparison once every minute or once every five minutes. Other periodicities could be used as well. If the measured latency exceeds the threshold, then the base station will broadcast an updated value of AuxiliaryPilotChannelMinPayload in a packet-size-threshold message. As an example, if the latency metric is EVDO session set-up time, then the threshold could have a value of five seconds. Thus, if average EVDO session set-up times exceeded five seconds, the base station would broadcast a packet-size-threshold message. Other threshold values could be used as well, and could be set according to the latency metric. For instance, if the latency metric is push-to-talk set-up time, then the threshold value could be one second.

In further accordance with the example embodiment, base station will maintain the current value of AuxiliaryPilotChannelMinPayload as one of a table of values. As describe above, the table of values can be arranged in increasing order from a minimum value to a maximum value, and as with ATs, the base station will maintain the table in its memory (e.g., random-access memory, solid state memory, disk-based memory, etc.). The current value would correspond to one of the table entries. When a given comparison of observed latency with threshold latency yields a determination to increase AuxiliaryPilotChannelMinPayload, the base station will select the next larger value in the table after the current value. The selected value will replace the current value as a new current value (which also corresponds to the updated value). If the current value is the maximum table value, then the base station will leave the current value unchanged. Once the current value is replaced with the increased value, the base station will mark the table entry corresponding to the new current value and broadcast the new value in a packet-size-threshold message.

After broadcasting the increased value of AuxiliaryPilotChannelMinPayload, the base station will continue to monitor latency. If the latency remains above the threshold, then base station will again increase AuxiliaryPilotChannelMinPayload. The base station may also observe a decrease in latency at one time or another. As this occurs, the base station can decrease the current value of AuxiliaryPilotChannelMinPayload in a reverse manner. Correspondingly, access terminals may decrease their locally-stored values of AuxiliaryPilotChannelMinPayload in response to receiving packet-size-threshold messages with decreasing values of AuxiliaryPilotChannelMinPayload from the base station. As with the table maintained in ATs, the table of AuxiliaryPilotChannelMinPayload values in the base station could, by way of example, correspond to the list {128, 256, 512, 768, 1,024, 1,536, 3,072, 4,096, 6,144, 8,192, 12,288}, again in units of bits. Further, the table could be extended at the high end to include a maximum value exceeding any packet payload size used in practice. This would allow the base station to select a maximum updated value of AuxiliaryPilotChannelMinPayload that when applied by best-effort ATs would effectively preclude any auxiliary pilot triggering. For instance, if no AT ever transmitted a packet payload size larger than X bits, where X is set according EVDO protocols, then setting the updated value to a maximum value of 2X, for instance, would ensure that no best-effort AT would ever transmit its auxiliary pilot as long as that value is in effect.

As described above, since the base station and the served ATs use the same table, the base station could encode the updated value in any given packet-size-threshold message as a table index. An AT receiving such a packet-size-threshold message could then interpret the index in terms of a table value.

4. Implementation of Example Embodiment

As described above, the example embodiment involves actions and operations carried out by both the access terminal and the base station (or serving sector). As such, the example embodiment may be considered as comprising a "client-side," associated with the access terminal (or other client communication device), and a "system-side," associated with the base station (or BTS cell or sector). The example embodiment can be implemented as executable steps and operations of a client-side method carried out by an access terminal, and as executable steps and operations of a system-side method carried out by a base station (or BTS cell or sector). Implementation of the example embodiment can further be considered as including means for carrying out both the client-side method and the system-side method. Example implementations of both the client-side method and means and the system-side method and means are described below. By way of example, both the access terminal and the base station are taken to be configured to operate according to IS-856 in a similarly-compliant wireless communication system, such as the one described above in connection with FIG. 3.

a. Example Method Implementations (1) Implementation of Client-Side Method

Figure 4:
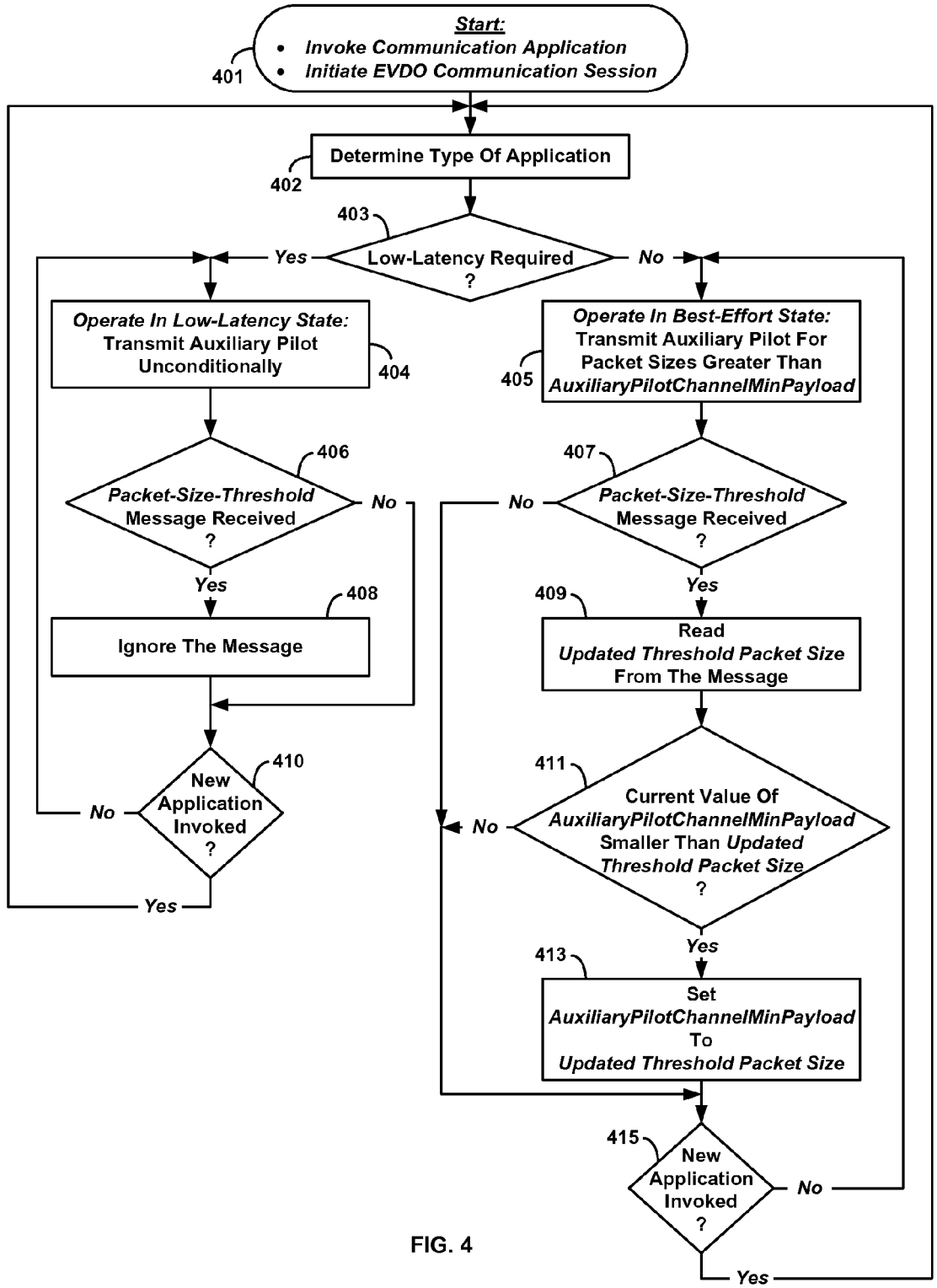
FIG. 4 illustrates an example embodiment of logical steps for implementing in an access terminal a method of dynamic adjustment of auxiliary pilot triggering based on latency.

FIG. 4 is a logical flowchart representing executable steps and operations that could be carried out by an access terminal to implement an example client-side method of dynamic adjustment of auxiliary pilot triggering based on latency. It will be appreciated that the steps could be implemented in an access terminal (or similar device) as executable instructions stored in the memory of the AT and executed by one or more processors of the AT.

By way of example, the AT initially has no active communication session in the illustration of the client-side method in FIG. 4. For instance, the AT may be in an idle state. At the start 401 in the figure, the AT invokes a communication application and initiates an EVDO communication session via a serving base station. The EVDO communication session may then be assumed to be established according to well-known protocols. For purposes of the illustration, an arbitrary communication application is invoked at start 401; i.e., it could be a low-latency application or a best-effort application at this point in the logical flow.

At step 402, the type of application is determined. In particular, the AT determines if the application is a low-latency application or a best-effort application. The determination could be made base on an identifier of the application, a configuration file associated with the application, or some other means.

At step 403, the AT determines whether the application requires low-latency, based on the determination of application type made at step 402. If the application does require low latency ("Yes" branch for step 403), the AT begin to operate in the low-latency state at step 404. As described above, in this state the AT transmits its auxiliary pilot unconditionally.

While operating in the low-latency state, the AT may receive a packet-size-threshold message broadcast by the base station. The AT may recognize receipt of such a message as a matter of course as it receives and processes transmissions on its reverse traffic channel. Determination that a particular message has been received may therefore be considered an event-driven process. However, for purposes of this illustration, the AT's determination of whether it has received a packet-size-threshold message is represented as a test or check. Thus at step 406, the AT determines if it has received a packet-size-threshold message.

Because the AT is operating in the low-latency state, it transmits its auxiliary pilot without regard to any comparison of packet size with AuxiliaryPilotChannelMinPayload (or other form of threshold packet size). As such, the AT's operation is not affected by whether or not it receives a packet-size-threshold message. Thus, if the AT has received a packet-size-threshold message ("Yes" branch from step 406), the AT ignores the message and proceeds to step 410. And if the AT has not received a packet-size-threshold message ("No" branch from step 406), the AT also proceed to step 410.

At step 410, the AT determines if it is still executing the same communication application or if a new application has been invoked. If the AT has not invoked a new application ("No" branch from step 410), then the AT remains in the low-latency state, as represented by return to step 404. If the AT If the AT has invoked a new application ("Yes" branch from step 410), then the AT returns to step 402, where it again determines the type of application.

As represented by the check at step 410, the AT invokes and executes one application at a time. It will be appreciated that the AT could execute more than one communication application at a time. In this case, the check at step 410 would determine whether at least one low-latency application still executing, or if only new applications of as yet undetermined type are executing. Accordingly, a determination that at least one low-latency application still executing would represent the "No" branch from step 410, while a determination that only new applications of as yet undetermined type are executing would represent the "Yes" branch from step 410.

If the determination at step 403 is that the application does not require low latency ("No" branch for step 403), the AT begin to operate in the best-effort state at step 405. As described above, in this state the AT triggers its auxiliary pilot based a comparison of transmitted packet size with AuxiliaryPilotChannelMinPayload (or other form of threshold packet size), wherein the value of AuxiliaryPilotChannelMinPayload is adjustable according to packet-size-threshold messages that may be received from the base station.

While operating in the best-effort state, the AT may receive a packet-size-threshold message broadcast by the base station. As when in the low-latency state, the AT may recognize receipt of such a message as a matter of course as it receives and processes transmissions on its reverse traffic channel. Again, for purposes of this illustration, the AT's determination of whether it has received a packet-size-threshold message is represented as a test or check. Thus at step 407, the AT determines if it has received a packet-size-threshold message.

If at step 407 the AT determines that it has received a packet-size-threshold message ("Yes" branch from step 407), the AT then reads the updated threshold packet size in the message, as indicated at step 409. Then at step 411, the AT determines if its current value of AuxiliaryPilotChannelMinPayload is smaller than the updated threshold packet size.

If the current value is smaller than the updated threshold packet size ("Yes" branch from step 411), the AT sets its locally-stored value of AuxiliaryPilotChannelMinPayload to the updated threshold packet size. The AT then proceeds to step 415, where the AT determines if it is still executing the same communication application or if a new application has been invoked. If the AT has not invoked a new application ("No" branch from step 415), then the AT remains in the best-effort state, as represented by return to step 405. If the AT has invoked a new application ("Yes" branch from step 415), then the AT returns to step 402, where it again determines the type of application.

If at step 407 the AT determines that it has not received a packet-size-threshold message ("No" branch from step 407), the AT then proceeds directly to step 415. Similarly, if at step 411 the AT determines that its current value of AuxiliaryPilotChannelMinPayload is not smaller than the updated threshold packet size ("No" branch from step 411), then the AT proceeds directly to step 415 without adjusting its current value.

As with step 410, the check at step 415 implies that the AT invokes and executes one application at a time. Again, the AT could execute more than one communication application at a time. Thus the check at step 415 could determine whether only best-effort applications are still executing, or if only new applications of as yet undetermined type are executing. Accordingly, a determination that only best-effort applications are still executing would represent the "No" branch from step 415, while a determination that only new applications of as yet undetermined type are executing would represent the "Yes" branch from step 415.

It may be noted that when step 402 is arrived at from either step 410 or step 415, the check that then follows at step 403 could result in a transition from the best-effort state to the low-latency state, or vice versa.

It will be appreciated that the steps shown in FIG. 4 are meant to illustrate example the client-side method. As such, various steps could be altered or modified, and the ordering of certain steps could be changed, while still achieving the overall desired operation.

(2) Implementation of System-Side Method

Figure 5:
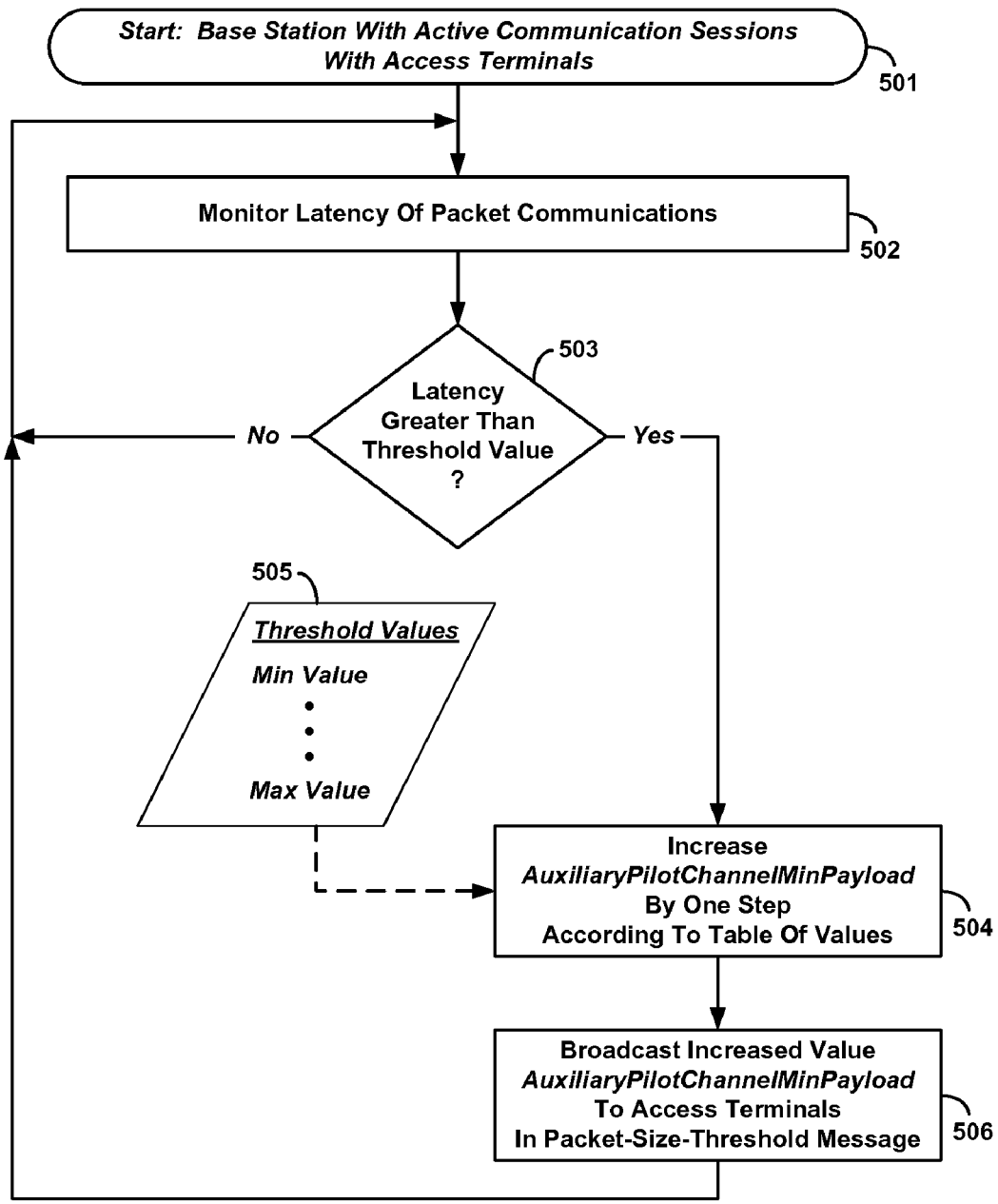
FIG. 5 illustrates an example embodiment of logical steps for implementing in a base station a method of dynamic adjustment of auxiliary pilot triggering based on latency.

FIG. 5 is a logical flowchart representing executable steps and operations that could be carried out by a base station (or BTS cell or sector) to implement an example system-side method of dynamic adjustment of auxiliary pilot triggering based on latency. It will be appreciated that the steps could be implemented in a base station (or BTS cell or sector) as executable instructions stored in the memory of the base station and executed by one or more processors of the base station.

At the start 501 in FIG. 5, by way of example, the base station is engaged in active EVDO packet communication sessions with one or more access terminals. At step 502, the base station monitors the latency of packet communications with those (and possible other) ATs. For example, the base station can monitor one or more latency metrics in a manner described above.

At step 503, the base station determines if the observed (monitored) latency is greater than a threshold latency. If it is greater ("Yes" branch from step 503), the base station increases its current value of AuxiliaryPilotChannelMinPayload at step 504. As indicated in FIG. 5, increasing AuxiliaryPilotChannelMinPayload is achieved according to table 505 of Threshold Values. This corresponds to the table of values described above, wherein the current value of the threshold packet size is one of the values in the table. The increased value is the next value in the table larger than the current value. The dashed arrow from table 505 to step 504 represents retrieval of the table and/or values in order to affect the increase.

After increasing AuxiliaryPilotChannelMinPayload, the base station broadcasts the updated value in a packet-size-threshold message, as indicated at step 506. The base station then returns to step 502, where it continues to monitor latency.

If at step 503 the base station determines that the latency is not greater than the threshold latency ("No" branch from step 503), the base station returns directly to step 502, without making any change to the current value of AuxiliaryPilotChannelMinPayload.

It will be appreciated that the steps shown in FIG. 5 are meant to illustrate example the system-side method. As such, various steps could be altered or modified, and the ordering of certain steps could be changed, while still achieving the overall desired operation. Additionally, FIG. 5 omits possible steps that could be carried when the base station determines that latency is decreasing. This omission is not intended to preclude such functionality from the example implementation.

b. Example Means (1) Example Access Terminal

Figure 6:
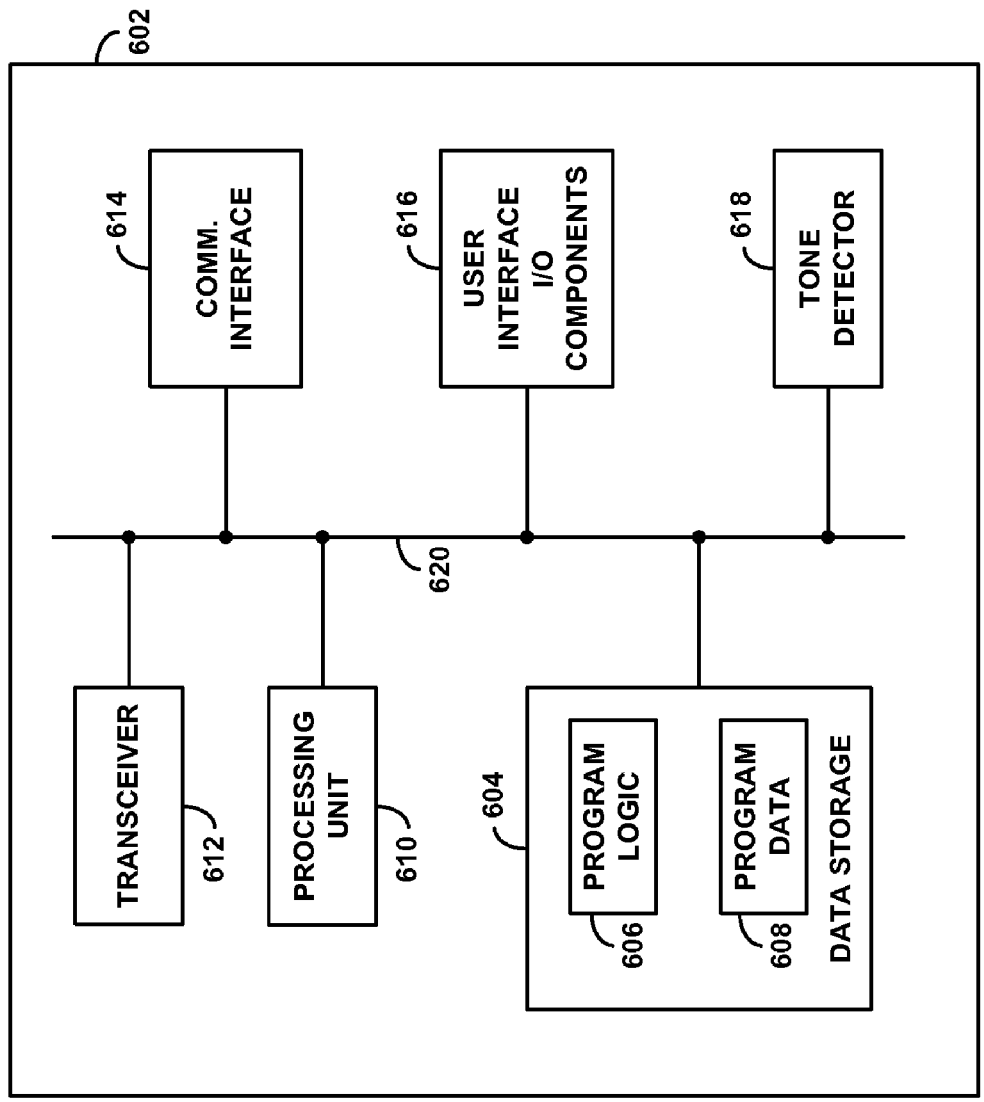
FIG. 6 is a block diagram of an example access terminal in which dynamic adjustment of auxiliary pilot triggering based on latency may be implemented.

FIG. 6 is a simplified block diagram depicting functional components of an example access terminal 602 in which the client-side method of dynamic adjustment of auxiliary pilot triggering based on latency could be implemented. The example AT 602 could be a cell phone, a personal digital assistant (PDA), a pager, a wired or wirelessly-equipped notebook computer, or any other sort of device, as represented as AT 302 in FIG. 3, for example. As shown in FIG. 6, the example AT 602 includes data storage 604, processing unit 610, transceiver 612, communication interface 614, user-interface I/O components 616, and tone detector 618, all of which may be coupled together by a system bus 620 or other mechanism.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of AT 602 relevant to dynamic adjustment of auxiliary pilot triggering based on latency are discussed briefly below.

Communication interface 614 in combination with transceiver 612, which may include one or more antennas, enables communication with the network, including reception of packet-size-threshold messages from the serving base station and transmission of both the primary and auxiliary pilots, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 610 comprises one or more general-purpose processors (e.g., INTEL microprocessors) and/or one or more special-purpose processors (e.g., dedicated digital signal processor, application specific integrated circuit, etc.). In turn, the data storage 604 comprises one or more volatile and/or non-volatile storage components, such as magnetic or optical memory or disk storage. Data storage 604 can be integrated in whole or in part with processing unit 610, as cache memory or registers for instance. In example AT 602, as shown, data storage 604 is configured to hold both program logic 606 and program data 608.

Program logic 606 may comprise machine language instructions that define routines executable by processing unit 610 to carry out various functions described herein. In particular the program logic, communication interface, and transceiver may operate cooperatively to carry out logical operation such as that discussed above and illustrated in FIG. 4. Further, program data 608 may be arranged to store a local copy of AuxiliaryPilotChannelMinPayload (or other threshold packet size) as well as a table of threshold values, used in conjunction with the logical operations described above.

It will be appreciated that there can be numerous specific implementations of an access terminal, such as AT 602, in which the client-side method of dynamic adjustment of auxiliary pilot triggering based on latency could be implemented. Further, one of skill in the art would understand how to devise and build such an implementation. As such, AT 602 is representative of means for carrying out the client-side method of dynamic adjustment of auxiliary pilot triggering based on latency in accordance with the methods and steps described herein by way of example.

(2) Example Base Station

Figure 7:
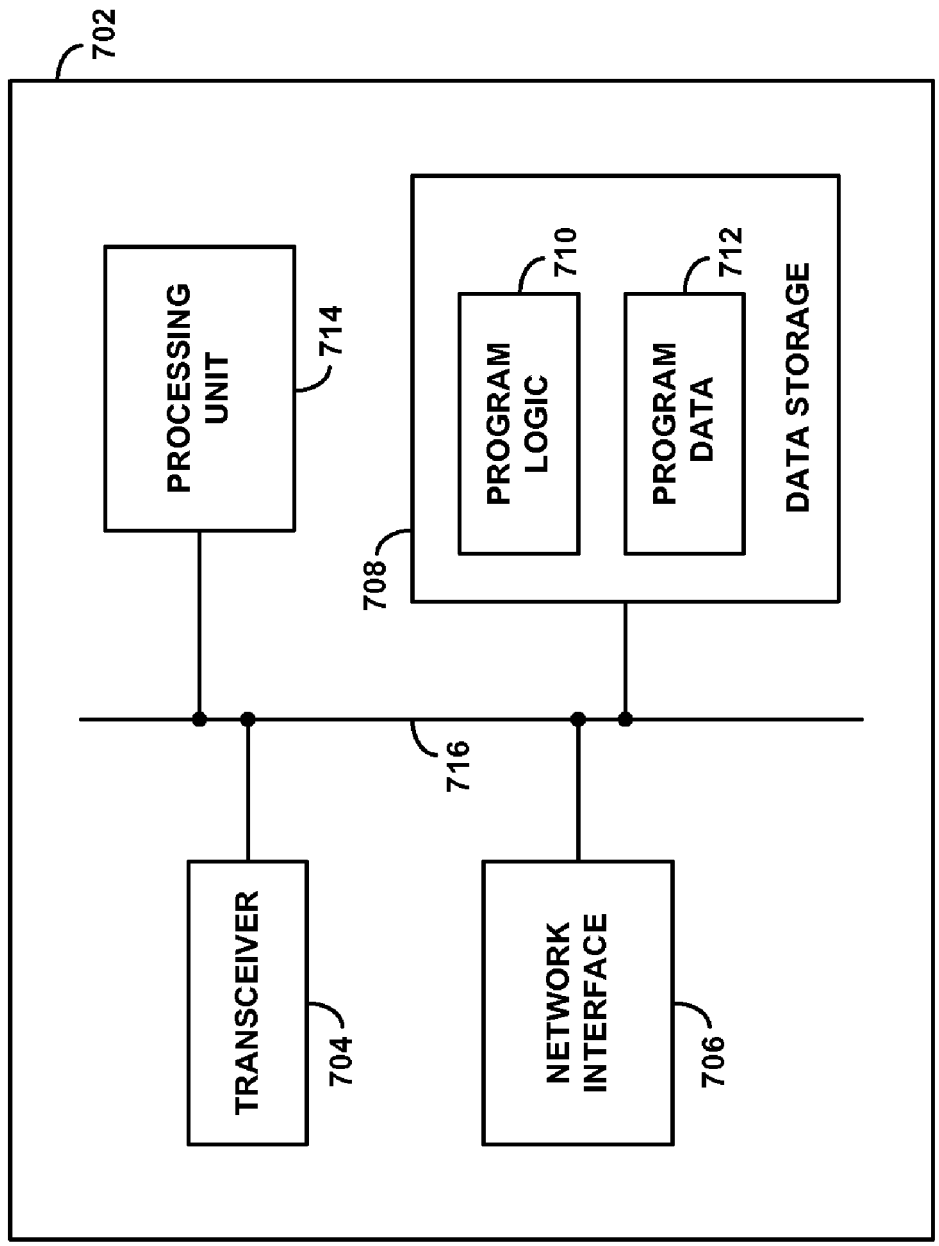
FIG. 7 is a block diagram of an example base station in which dynamic adjustment of auxiliary pilot triggering based on latency may be implemented.

FIG. 7 is a simplified block diagram depicting functional components of an example base station 702 in which the system-side method of dynamic adjustment of auxiliary pilot triggering based on latency could be implemented. As shown in FIG. 7, the example base station 702, representative of BTS 304 or BSC 306 integrated with BTS 304 in FIG. 3, for instance, includes a transceiver 704, network interface 706, a processing unit 714, and data storage 708, all of which may be coupled together by a system bus 716 or other mechanism. In addition, the base station may also include external storage, such as magnetic or optical disk storage, although this is not shown in FIG. 7.

These components may be arranged to support conventional operation in a wireless communication network that is compliant with a CDMA family of protocols, such as network 300 illustrated in FIG. 3. The details of such an arrangement and how these components function to provide conventional operation are well-known in the art, and are not described further herein. Certain aspects of base station 702 relevant to dynamic adjustment of auxiliary pilot triggering based on latency are discussed briefly below.

Network interface 706 enables communication on a network, such network 300. As such, network interface 706 may take the form of trunk or optical link that can be coupled with a TDM switch such as MSC 308, or an Ethernet network interface card or other physical connection that can be coupled with PCF 314, for instance. Further, network interface 706 in combination with transceiver 704, which may include one or more BTS antennas, enables air interface communication with one or more access terminals, supporting forward-link transmissions of packet-size-threshold messages, among other message and commands, and supporting reception reverse-link traffic, and primary and auxiliary pilot transmissions, among others, on reverse links.

Processing unit 714 comprises one or more general-purpose processors (e.g., INTEL microprocessors) and/or one or more special-purpose processors (e.g., dedicated digital signal processor, application specific integrated circuit, etc.). In turn, the data storage 708 comprises one or more volatile and/or non-volatile storage components, such as magnetic or optical memory or disk storage. Data storage 708 can be integrated in whole or in part with processing unit 714, as cache memory or registers for instance. As further shown, data storage 708 is equipped to hold program logic 710 and program data 712.

Program logic 710 may comprise machine language instructions that define routines executable by processing unit 714 to carry out various functions described herein. In particular the program logic, communication interface, and transceiver may operate cooperatively to carry out logical operation such as that discussed above and illustrated in FIG. 5. Further, program data 712 may be arranged to store the current value of AuxiliaryPilotChannelMinPayload (or other threshold packet size) as well as a table of threshold values, used in conjunction with the logical operations described above.

It will be appreciated that there can be numerous specific implementations of a base station, such as base station 702, in which the system-side method of dynamic adjustment of auxiliary pilot triggering based on latency could be implemented. Further, one of skill in the art would understand how to devise and build such an implementation. As such, base station 702 is representative of means for carrying out the system-side method of dynamic adjustment of auxiliary pilot triggering based on latency in accordance with the methods and steps described herein by way of example.

5. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. In an access terminal operating in a wireless communication system that includes a base station, a method comprising:
   at the access terminal, making a determination of whether the access terminal will engage in a communication requiring low latency;
   responsive at least to the determination being that the access terminal will not engage in a communication requiring low latency, the access terminal beginning to operate in a best-effort state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal; and
   responsive at least to the determination being that the access terminal will engage in a communication requiring low latency, the access terminal beginning to operate in a low-latency state in which at least (i) the access terminal transmits the primary beacon signal on the air interface communication link to the base station, and (ii) the access terminal unconditionally activates and transmits the secondary beacon signal on the air interface communication link to the base station concurrently with transmission of the primary beacon signal,
   wherein unconditionally activating and transmitting a secondary beacon signal comprises transmitting the secondary beacon signal concurrently with transmission of the primary beacon signal without regard to packet size of packets to be transmitted.

2. The method of claim 1, wherein the access terminal beginning to operate in the best-effort state comprises the access terminal transitioning from operating in the low-latency state.

3. The method of claim 1, wherein the access terminal beginning to operate in the low-latency state comprises the access terminal transitioning from operating in the best-effort state.

4. The method of claim 1, wherein the access terminal and the wireless communication system both operate at least according a CDMA family of protocols, including IS-856,
   wherein the primary beacon signal is a primary pilot signal and the secondary beacon signal is an auxiliary pilot signal,
   wherein the threshold packet size corresponds to a value of AuxiliaryPilotChannelMinPayload,
   and wherein the condition that the access terminal transmits a packet having a size larger than a threshold packet size corresponds to a condition that the access terminal transmits a packet having a payload size larger than AuxiliaryPilotChannelMinPayload.

5. The method of claim 1, wherein the primary beacon signal provides the base station with a common timing reference between the base station and the access terminal, the common timing reference facilitating decoding by the base station of other signals transmitted by the access terminal,
   and wherein the secondary beacon signal provides the base station with enhanced reliability of the common timing reference.

6. The method of claim 1, wherein making the determination of whether the access terminal will engage in a communication requiring low latency comprises determining whether the access terminal will engage in a real-time communication, the real-time communication being at least one of voice over internet protocol (VoIP), push-to-talk, and real-time media transfer.

7. The method of claim 1, further comprising:
while operating in the best-effort state:
receiving a packet-size-threshold message from the base station, the packet-size-threshold message being indicative of transmission delay monitored by the base station and including an updated threshold packet size; and
responsive to receiving the packet-size-threshold message, the access terminal increasing the threshold packet size by an amount based on the updated threshold packet size.

8. In an access terminal operating in a wireless communication system that includes a base station, a method comprising:
the access terminal operating in a state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal;
at the access terminal, while both operating in the state and engaging in a communication that does not require low latency, receiving a packet-size-threshold message from the base station, the packet-size-threshold message being indicative of transmission delay monitored by the base station and including an updated threshold packet size; and
responsive to receiving the packet-size-threshold message, the access terminal increasing the threshold packet size by an amount based on the updated threshold packet size.

9. The method of claim 8, wherein the access terminal and the wireless communication system both operate at least according a CDMA family of protocols, including IS-856,
wherein the primary beacon signal is a primary pilot signal and the secondary beacon signal is an auxiliary pilot signal,
wherein the threshold packet size corresponds to a value of AuxiliaryPilotChannelMinPayload,
and wherein the condition that the access terminal transmits a packet having a size larger than a threshold packet size corresponds to a condition that the access terminal transmits a packet having a payload size larger than AuxiliaryPilotChannelMinPayload.

10. The method of claim 8, wherein the primary beacon signal provides the base station with a common timing reference between the base station and the access terminal, the common timing reference facilitating decoding by the base station of other signals transmitted by the access terminal,
and wherein the secondary beacon signal provides the base station with enhanced reliability of the common timing reference.

11. The method of claim 8, wherein engaging in a communication that does not require low latency comprises engaging in a best-effort communication.

12. The method of claim 8, wherein the access terminal and the wireless communication system both operate at least according a CDMA family of protocols, including IS-856, and wherein receiving the packet-size-threshold message from the base station comprises receiving a Quick Config message from the base station, the Quick Config message including data corresponding to the updated threshold packet size.

13. The method of claim 8, wherein the threshold packet size has a current value, the current value being a value prior to the access terminal receiving the packet-size-threshold message from the base station,
and wherein increasing the threshold packet size by an amount based on the updated threshold packet size comprises:
setting the threshold packet size to the updated threshold packet size if the current value is smaller than the updated threshold packet size; and
leaving the threshold packet size unchanged if the current value is not smaller than the updated threshold packet size.

14. In a base station configured to operate as part of a wireless communication system, a method comprising:
at the base station, monitoring latency of packet communications with one or more access terminals served by the base station;
at the base station, making a determination that the latency exceeds a threshold latency; and
in response to the determination, broadcasting a packet-size-threshold message on an air interface to the one or more access terminals, the packet-size-threshold message including a threshold packet size for use by each of the one or more access terminals to set a respective trigger for controlling transmission power of a respective beacon signal to the base station.

15. The method of claim 14, wherein monitoring latency of packet communications with one or more access terminals served by the base station comprises monitoring a latency metric, the latency metric being at least one of call set-up time, session set-up time, push-to-talk set-up time, and packet transfer delay.

16. The method of claim 15, wherein the threshold packet size is associated with a minimum size that any given packet transmitted by any given access terminal must have in order to trigger a boost in transmission power of the respective beacon signal of the any given access terminal.

17. The method of claim 16, wherein the base station and each of the one or more access terminals operate at least according a CDMA family of protocols, including IS-856,
wherein the respective beacon signal comprises at least a respective primary pilot signal,
and wherein the threshold packet size corresponds to a value of AuxiliaryPilotChannelMinPayload.

18. The method of claim 14, wherein the threshold packet size has a current value, the current value being a value prior to broadcasting the packet-size-threshold message,
wherein the current value is one of a table of distinct values that is arranged in increasing order from a minimum value to a maximum value,
and wherein broadcasting the packet-size-threshold message comprises:
setting the threshold packet size to an updated value that is the next larger of the distinct values in the table beyond the current value; and
including in the packet-size-threshold message the threshold packet size having the updated value.

19. An access terminal configured to operate in a wireless communication system that includes a base station, the access terminal comprising:
means for making a determination of whether the access terminal will engage in a communication requiring low latency;

means for, responsive at least to the determination being that the access terminal will not engage in a communication requiring low latency, beginning to operate in a best-effort state in which at least (i) the access terminal transmits a primary beacon signal on an air interface communication link to the base station, and (ii) upon a condition that the access terminal transmits a packet having a size larger than a threshold packet size, the access terminal activates and transmits a secondary beacon signal on the air interface communication link to the base station concurrently with transmission of the primary beacon signal; and means for, responsive at least to the determination being that the access terminal will engage in a communication requiring low latency, beginning to operate in a low-latency state in which at least (i) the access terminal transmits the primary beacon signal on the air interface communication link to the base station, and (ii) the access terminal unconditionally activates and transmits the secondary beacon signal on the air interface communication link to the base station concurrently with transmission of the primary beacon signal, wherein unconditionally activating and transmitting a secondary beacon signal comprises transmitting the secondary beacon signal concurrently with transmission of the primary beacon signal without regard to packet size of packets to be transmitted.

20. The access terminal of claim 19, wherein means for beginning to operate in the best-effort state comprise means for transitioning from operating in the low-latency state, and wherein means for beginning to operate in the low-latency state comprise means for transitioning from operating in the best-effort state.

21. The access terminal of claim 19, wherein the access terminal is further configured to operate at least according a CDMA family of protocols, including IS-856, wherein the primary beacon signal is a primary pilot signal and the secondary beacon signal is an auxiliary pilot signal, wherein the threshold packet size corresponds to a value of AuxiliaryPilotChannelMinPayload, and wherein the condition that the access terminal transmits a packet having a size larger than a threshold packet size corresponds to a condition that the access terminal transmits a packet having a payload size larger than AuxiliaryPilotChannelMinPayload.

22. The access terminal of claim 19, further comprising:

means for receiving a packet-size-threshold message from the base station while operating in the best-effort, wherein the packet-size-threshold message is indicative of transmission delay monitored by the base station and includes an updated threshold packet size; and means for increasing the threshold packet size by an amount based on the updated threshold packet size while operating in the best-effort state.

23. The access terminal of claim 22, wherein the threshold packet size has a current value, the current value being a value prior to receiving the packet-size-threshold message from the base station, and wherein increasing the threshold packet size by an amount based on the updated threshold packet size comprises:

setting the threshold packet size to the updated threshold packet size if the current value is smaller than the updated threshold packet size; and leaving the threshold packet size unchanged if the current value is not smaller than the updated threshold packet size.

\* \* \* \* \*